March 3, 1970
M. MENDELSON
3,498,910
APPARATUS AND PROCESS FOR THE CONTROLLED OSMOTIC SEPARATION OF WATER FROM SEA WATER
Filed Sept. 3, 1968
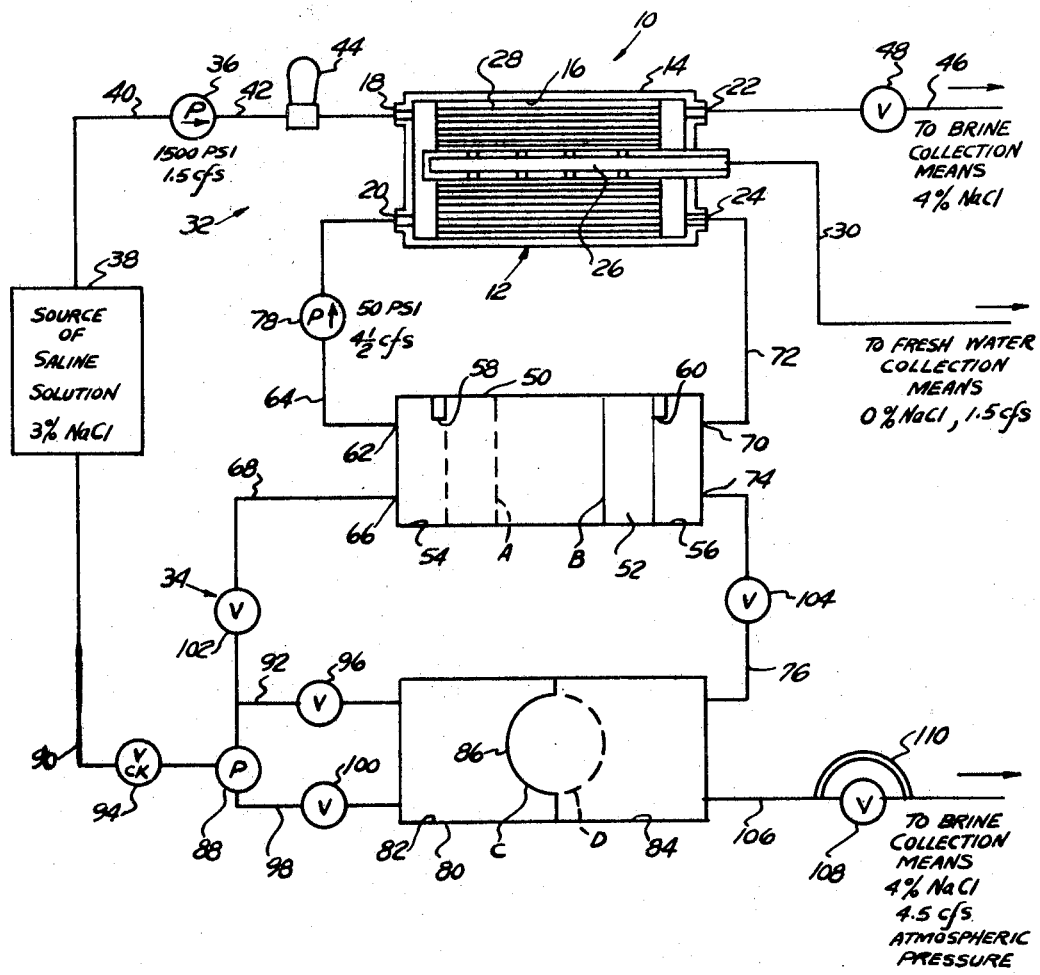
INVENTOR
MORRIS MENDELSON
BY Hauke, Keen, Gifford, & Patalidis
ATTORNEYS United States Patent Office 3,498,910
Patented Mar. 3, 1970

3,498,910
APPARATUS AND PROCESS FOR THE CONTROLLED OSMOTIC SEPARATION OF WATER FROM SEA WATER
Morris Mendelson, 16156 Oxley,
Southfield, Mich. 48075
Continuation-in-part of application Ser. No. 698,667,
Jan. 17, 1968. This application Sept. 3, 1968, Ser.
No. 756,842
Int. Cl. B01d 13/00
U.S. Cl. 210—23                           10 Claims

ABSTRACT OF THE DISCLOSURE

A system for recovering fresh water from sea water in a reverse-osmosis permeability cell connected with primary and secondary feed circuits. The primary feed circuit continuously supplies the cell with sea water and includes a constant delivery pump for delivering sea water from a source, and a secondary pump for delivering sea water from a temporary storage chamber at a rate to compensate for the reduction in the separability characteristics of the permeability membrane as it accumulates minerals and salts. The secondary feed circuit, normally fluidly isolated from the primary circuit, is periodically connected with the primary circuit to replenish the temporary storage chamber and to wash the permeability membrane of accumulated salts.

CROSS REFERENCE TO RELATED APPLICATION

This application is a continuation-in-part of my application Ser. No. 698,667 filed Jan. 17, 1968.

BACKGROUND OF THE INVENTION

This invention relates to apparatus and process for the desalination of sea and brackish water by the method of reverse osmosis and more particularly to such an apparatus having means for supplementing the flow rate of the feed solution into the permeability cell as the membrane accumulates minerals and salts to provide a constant fresh water output.

In my aforementioned co-pending patent application a novel apparatus and process for separating water from a saline solution such as sea water was disclosed which in its simplest terms consists of a permeability cell having primary and secondary feed circuits. The primary circuit continuously introduces the sea water into the cell for treatment by a semipermeable membrane. The secondary circuit includes a temporary storage chamber and is normally isolated from the primary circuit, but is periodically connected with the primary circuit to introduce a second stream of water into the permeability cell to flush the accumulated minerals and salts collected by the membrane from the cell.

Another problem associated with separation processes of this nature is that as the membrane accumulates a deposit of salts and minerals, its permeability capacity is reduced so that the fresh water output with a constant sea water input gradually diminishes between wash cycles. The broad purpose of the present invention is to provide means in the primary circuit for supplementing the sea water flow rate through the cell so that the fresh water output remains substantially constant.

SUMMARY

The preferred embodiment of the invention comprises a fresh water separation system having a permeability membrane chamber continuously supplied with an untreated saline solution such as sea water by a primary feed circuit and intermittently supplied by a secondary feed circuit which produces a wash cycle for periodically removing the accumulated minerals, salts and brine that are collected on the saline side of the membrane. As the fresh water is separated from the sea water solution, the remaining solution increases in salinity which with the accumulation of salts on the saline side of the membrane reduces the capacity of the membrane to pass fresh water for a given flow rate. This reduction in capacity can be compensated for by increasing the sea water flow rate through the cell. To supplement the sea water input the primary circuit has a cylindrical temporary storage chamber subdivided by a free piston into a pair of subchambers. One of the subchambers is connected to the upstream side of the membrane separation chamber and has an inlet connected to the secondary circuit. The other subchamber has an inlet connected to the downstream side of the separation chamber and an outlet connected to the secondary circuit. During the operating phase when the two circuits are fluidly isolated, the free piston in the cylinder, assisted by a low pressure pump, transfers untreated solution from the cylinder to the upstream side of the separation chamber to supplement the solution introduced from the primary source. As the capacity of the membrane to separate fresh water is reduced, the sea water flow rate through the cell is increased so that the fresh water output remains at a fairly constant level.

As the free piston transfers sea water from one subchamber to the separation chamber, the brine or treated solution is drawn from the separation chamber into the second subchamber. At the end of the piston's stroke, the primary and secondary circuits are connected and the piston's motion reversed by replenishing the temporary storage chamber in the primary circuit from a storage chamber in the secondary circuit and by transferring the brine to the secondary circuit. The transfer pump in the secondary circuit adds sufficient energy to the sea water delivered to the primary circuit to create a secondary stream in the separation chamber to wash the accumulated salts and other materials collected on the surface of the membrane so that it is restored to its original separation capacity.

Thus the preferred separation system employs a primary circuit having means for supplementing the sea water flow through the separation cell to compensate for the gradually reduced capacity of the membrane to permeate water, and a secondary feed circuit for periodically replenishing the solution in the temporary storage chamber in the primary circuit and for producing a wash cycle to flush the accumulated deposits from the sea water side of the membrane. These and other advantages of the present invention will readily become apparent to one skilled in the art to which the invention pertains upon reference to the following detailed description.

DESCRIPTION OF THE DRAWING

The description refers to the accompanying schematic drawing of a reverse osmosis desalination system illustrating the preferred embodiment of the present invention.

DESCRIPTION OF THE PREFERRED EMBODIMENT

Referring to the drawing for the description of the preferred embodiment, a desalination system 10 is illustrated schematically as comprising a permeability cell 12 formed of a tubular housing 14 defining an interior separation chamber 16. The housing 14 has a pair of inlets 18 and 20 at one end and a pair of brine discharge outlets 22 and 24 at its opposite end. A perforated, tubular, fresh water collection pipe 26 extends substantially the full length of the interior of the separation chamber 16 with its inner end closed and its outer end extending through the end of the housing 14.

A semi-permeable membrane 28 is mounted in the housing between the inlets 18 and 20 and the outlets 22 and 24 so that an untreated saline solution such as sea water introduced through the inlets passes axially through the housing for treatment by the membrane to produce fresh water which permeates into the collection pipe 26 and a concentrated brine which is discharged through the outlets 22 and 24. The fresh water collected from the system by the collection pipe 26 is discharged through a conduit 30 to a fresh water collection means.

The flow of untreated solution into the separation chamber 16 is supplied by a high pressure, primary circuit, generally indicated at 32, and a normally low pressure, secondary circuit, generally indicated at 34. The high pressure circuit 32 has a high pressure, low volume, continuously operating pump 36 which draws untreated saline solution from a source 38 through a feed conduit 40. The untreated solution is pressurized to 1500 p.s.i., which is considerably in excess of the osmotic pressure of the solution in the separation chamber 16, and then delivered through a conduit 42 and a flow accumulator 44 to the inlet 18 of the separation chamber 16. For purposes of illustration, the pump 36 delivers a solution with a 3% salt concentration at a rate of 1.5 cubic feet per second to the inlet 18 where the solution flows axially through the membrane 28. The membrane 28 permeates fresh water from the solution to the fresh water pipe 26 leaving treated solution with a greater salinity at the outlets 22 and 24. The outlet 22 is connected by a conduit 46 to a brine collection means. For purposes of illustration the treated solution is discharged with a 4% concentration of salt. A valve 48 in the conduit 46 provides means for regulating the discharge through the conduit 46.

The other half of the brine circuit comprises a cylindrical housing 50 in which a free piston 52 is mounted to internally divide the housing into a pair of subchambers 54 and 56. The piston 52 is movable in a stroke defined by a pair of stops 58 and 60. Normally the subchambers 54 and 56 are filled with a fluid so that the introduction of a fluid into either of the chambers at a pressure greater than the fluid in the other chamber moves the piston 52 toward the chamber with the lesser pressure.

The subchamber 54 has an outlet 62 connected by a conduit 64 to the inlet 20 of the separation chamber 16. Subchamber 54 also has an inlet 66 connected by a conduit 68 to the secondary circuit 34. The other subchamber 56 has an inlet 70 connected by a conduit 72 to the outlet 24 of the separation chamber 16, and an outlet 74 connected by conduit 76 to the secondary circuit 34.

When the subchamber 54 is full of untreated solution, movement of the piston 52 toward the left and into the subchamber 54 transfers the untreated solution through the conduit 64 where assisted by a low pressure pump having a capacity of 50 p.s.i. transfers the solution at a rate of 4.5 cubic feet per second into the separation chamber 16 where it supplements the solution introduced by the pump 36 into the inlet 18. The movement of the piston 52 toward the position illustrated at A from position B is assisted by drawing an equal volume of brine or treated solution through the outlet 24 into the subchamber 56. This movement of the piston from the position B to position A takes place when the primary and secondary circuits are fluidly isolated. The movement of the piston 52 in the reverse direction from position A to position B takes place when the primary and secondary circuits are fluidly connected so that fresh solution is introduced into the subchamber 54 and the brine in the subchamber 56 is discharged into the secondary circuit 34.

The secondary circuit 34 includes a temporary storage means 80 having a fluid chamber which is internally divided into a pair of subchambers 82 and 84 by a flexible diaphragm 86. A low pressure, high volume, continuously operating pump 88 periodically draws untreated solution from the source 38 through a feed conduit 90. The pump 88 raises the pressure of the solution drawn through the conduit 90 to about 50 p.s.i. and delivers it at a rate of 9 cubic feet per second through a conduit 92 to the subchamber 82. A check valve 94 in the conduit 90 prevents reverse flow through the conduit toward the source 38. A valve 96 in the conduit 92 is normally open when the subchamber 82 is being filled and closed when the solution in the subchamber 82 is being removed.

The pump 88 normally supplies solution through the conduit 92 into the subchamber 82 when the two feed circuits 32 and 34 are isolated, and draws solution from the subchamber 82 through a conduit 98 for delivery to the conduit 68 when the two circuits are connected. A valve 100 in the conduit 98 is normally closed when the subchamber 82 is being filled and open when the subchamber 82 is being emptied.

A valve 102 in the conduit 68 and a valve 104 in the conduit 76 provide means for isolating the two circuits 32 and 34 when they are closed and for fluidly connecting the two circuits when they are open. When the two circuits are separated by closing the valves 102 and 104, the pressure in the primary circuit is under the influence of the pump 36 and a pump 78 and the pressure in the secondary circuit is under the influence of the pump 88.

A discharge conduit 106 provides an outlet from the subchamber 84 to the brine collection means. A check valve 108 having a bleeder means 110 is disposed in the conduit 106 and adapted to automatically close when the secondary circuit is connected with the primary circuit 32 so that the pressure of both circuits is high at which time the flow throug hthe conduit 106 is governed by the bleeder means 110 which is connected on the down stream side to atmospheric pressure. When the primary circuit 32 and the secondary circuit 34 are fluidly isolated, the valve 102 automatically opens to increase fluid communication between the subchamber 84 and the brine collection means.

It can be seen that the inlet to the subchamber 84 is through the conduit 76 so that when the valve 104 is open, the brine or treated solution from the subchamber 56 in the primary circuit is transferred to the subchamber 84 in the secondary circuit; and when the valve 104 is closed, the solution in the subchamber 84 under the influence of the pressure differential existing between the subchamber 84 and the brine collection means and the movement of the diaphragm 86 transfers the treated solution from the subchamber 84 to the brine collection means.

The operating cycle of the preferred system may be considered as consisting of two phases, the first phase when the valves 102 and 104 are closed to fluidly separate the primary circuit 32 and the secondary circuit 34; and the second phase when the valves 102 and 104 are open to fluidly connect the two circuits. Considering the first phase, with the valves 102 and 104 closed, the high pressure pump 36 introduces a stream of untreated solution from the source 38 into the separation chamber 16 at a pressure of 1500 p.s.i. and at a rate of 1.5 cubic feet per second. The membrane 28 separates fresh water from the solution, leaving a residue of salts and a concentrated brine on the saline side of the membrane. During this first phase, the piston moves from position B toward position A so that the solution in the subchamber 54 is introduced into the separation chamber 16 to supplement the solution introduced by the pump 36. This increased flow rate compensates for the reduced capacity of the membrane 28 so that the fresh water output of the cell is fairly uniform. Because both subchambers 54 and 56 are connected with the high pressure separation chamber 16, the pressures on both sides of the piston 52 are substantially equal. The pump 78 produces a sufficient pressure differential to transfer the solution from the chamber 54 into the separation chamber 16.

During this first phase with the two circuits fluidly separated, the pump 88 in the secondary circuit draws water from the source 38 through the conduit 90 and delivers it through the conduit 92 to the subchamber 82 in the temporary storage means 80. As the solution is introduced into the subchamber 82, it causes the diaphragm 86 to flex toward the right into the subchamber 84 where the brine that has been accumulated in the subchamber 84 is discharged through the conduit 106 to the brine collection means. It is to be understood that during this first phase the diaphragm 86 is flexed from the position illustrated at C to the position illustrated at D and shown in phantom.

The second phase of the system's operation is initiated by opening of valves 102 and 104 so that the two circuits are fluidly connected. The pressure in the secondary circuit immediately jumps from about 50 p.s.i. to the higher pressure in the primary circuit which is about 1500 p.s.i. As the pressure increases in the secondary circuit, the check valves 94 and 108 automatically close. The valve 96 is closed and the valve 100 is opened so that the pump 88 commences to draw untreated solution from the subchamber 82 and to deliver it into the primary circuit where it replenishes the solution in the chamber 54 as well as creating a wash stream of solution into the separation chamber 16 so that the accumulated salt and minerals are removed from the membrane 28. The wash stream is created by the untreated solution being delivered through the conduit 64 at the increased pressure generated by pump 100. As the solution is removed from the subchamber 82, the brine or treated solution in the chamber 56 is transferred to the subchamber 84 with the diaphragm 86 being flexed from its position at D to position C. At the conclusion of the wash cycle, the free piston 52 is in position B with the storage chamber 54 full of untreated solution and the diaphragm 86 is in its position C with the storage chamber 84 full of treated solution.

The pump 88 adds sufficient pressure to the water when the two circuits 32 and 34 are connected to form a second stream of solution in the separation cell which mixes with the primary stream from the pump 36 so that the mixed streams wash the salts and minerals from the separation cell.

At the conclusion of the wash cycle, the valves 102 and 104 close to again isolate the primary circuit 32 from the secondary circuit 34, and the valve 96 is opened and the valve 100 is closed so that the pump 88 commences to fill the subchamber 82 and cause the diaphragm 86 to move toward its position D to discharge the treated solution in the subchamber 84 through the conduit 106. It is to be understood that when the valves 102 and 104 are closed the secondary circuit returns to its normal low pressure since the bleed means 110 is connected with the atmosphere, thereby permitting the check valves 94 and 108 to automatically open to connect the pump 88 with the source 38 and the subchamber 84 with the brine collection means.

The flow accumulator 44 insures that the flow rate through the membrane remains at a substantially constant rate when the secondary circuit is connected with the primary circuit.

For purposes of description, the solution from the source 38 has a 3% concentration of salt, the brine or treated solution is discharged with 4% concentration of salt and the collected fresh water has a 0% concentration of salt.

It is to be understood that the particular structure of the permeability membrane 28 illustrated in the drawing is not essential to the invention and that other types of semipermeable membranes may be employed which separate fresh water from a saline solution.

It can be seen that I have described an improved desalination system employing a reverse-osmosis membrane as the separating means and supplied by a primary feed circuit having means for compensating for the reduced effectiveness of the membrane during the operation of the operating cycle so that a fairly constant fresh water output is maintained, and a secondary circuit which is periodically connected with the primary circuit to replenish the temporary storage means in the primary circuit as well as to initiate a wash cycle for cleaning the membrane.

Having described my invention, I claim:

1. Apparatus for separating relatively pure water from an untreated aqueous solution, comprising:
   (a) housing means defining a separation chamber;
   (b) membrane means disposed in said separation chamber, said membrane means having first and second sides and being capable upon the introduction of an untreated aqueous solution, under a pressure greater than the osmotic pressure of the untreated solution, on the first of said sides to permeate water through to the second of said sides leaving a treated solution on said first side;
   (c) a source of untreated solution;
   (d) means for delivering a stream of untreated solution from said source into said separation chamber and to the first side of said membrane means under a pressure greater than the osmotic pressure of the untreated solution;
   (e) a first means for storing untreated solution;
   (f) second delivery means for delivering untreated solution from said first storing means into said separation chamber to the first side of said membrane means, under a pressure greater than the osmotic pressure of the untreated solution to supplement the flow rate of the solution delivered from said source to control the output of the water produced by said membrane means;
   (g) a second means for storing untreated solution; and
   (h) third delivery means for periodically producing a second stream of untreated solution from said second storing means for introduction into said separation chamber in a wash cycle to flush the treated solution from the first side of said membrane means.

2. The apparatus as defined in claim 1, wherein said first means for storing untreated solution comprises a temporary storage chamber and said third delivery means periodically replenishes said temporary storage chamber from said second means for storing untreated solution.

3. The apparatus as defined in claim 1, wherein said first and second delivery means, and said first source and said first means for storing untreated solution comprise a primary feed circuit for said separation chamber, and third delivery means and said second storing means comprises a secondary feed source, and including valve means having an open condition for fluidly connecting the two feed circuits for commencing the wash cycle, and a closed condition for fluidly isolating the two feed circuits upon completion of the wash cycle.

4. The apparatus as defined in claim 3, wherein said temporary storage chamber has a pair of inlets and a pair of outlets, and including a pumping member dividing said storage chamber into a pair of subchambers, each having an inlet for receiving fluid and an outlet for the discharge of fluid, said pumping member being operable upon the introduction of fluid into either of said subchambers at a pressure greater than the fluid in the second of said subchambers to pump the fluid from the second of said subchambers.

5. The apparatus as defined in claim 4, wherein said temporary storage chamber comprises a cylinder and said pumping member comprises a piston movably mounted in said cylinder.

6. The apparatus as defined in claim 4, wherein one of said subchambers has an inlet connected with said secondary circuit for the reception of untreated solution, and an outlet connected to said separation chamber for the discharge of untreated solution, and the second of said subchambers has an inlet connected with said separation chamber for the reception of treated solution and an outlet connected with said secondary circuit for the discharge of treated solution so that when said first and second circuits are fluidly connected, treated solution is introduced from said separation chamber into the second of said subchambers and untreated solution is transferred from the first of said subchambers to said separation chamber; and when said primary and secondary feed circuits are fluidly connected, untreated solution is introduced from said secondary circuit into the first of said subchambers to move said pumping member into the second of said subchambers to transfer treated solution from the second of said subchambers to said secondary circuit.

7. The apparatus as defined in claim 3, wherein said second storing means for untreated solution comprises a second temporary storage chamber having a pair of inlets and a pair of outlets, and including a pumping member dividing said second temporary storage chamber into a pair of subchambers each having an inlet for receiving fluid and an outlet for the discharge of fluid, said pumping member being operable upon the introduction of fluid into either of said subchambers under a pressure greater than the fluid in the second of said subchambers to pump fluid from the second of said subchambers.

8. The apparatus as defined in claim 7, wherein said second temporary storage chamber comprises a housing, and said pumping member comprises a flexible diaphragm internally dividing said housing into a pair of subchambers including a first subchamber having an inlet connected to said source of untreated solution and an outlet connected with said first means for storing untreated solution and the second of said subchambers having an inlet connected with the separation chamber for the transfer of treated solution when the two feed circuits are fluidly connected and an outlet connected to a collection means for said treated solution.

9. An apparatus as defined in claim 8, wherein said first storage means for untreated solution comprises a temporary storage chamber and said storage chamber has a pair of inlets and a pair of outlets and including a pumping member dividing said storage chamber into a pair of subchambers each having an inlet for receiving fluid and an outlet for the discharge of fluid, said pumping member being operable upon the introduction of fluid into either of said subchambers at a greater pressure than the fluid in the second of said subchambers to pump the fluid from the second of said subchambers.

10. A process for separating relatively pure water from an untreated aqueous solution, comprising the steps of:
 (a) pressurizing an untreated aqueous solution to an operating pressure greater than the osmotic pressure of said untreated solution;
 (b) delivering the pressurized untreated solution in a first stream to a semipermeable membrane separation means so that water is separated from the solution leaving a treated solution on one side of said membrane separation means;
 (c) pressurizing an untreated aqueous solution from a temporary storage chamber and delivering the solution from a temporary storage chamber and delivering the solution from the temporary storage chamber to the membrane separation means to supplement the solution delivered from the first source so that fresh water is separated by the membrane separation means at a controlled rate and
 (d) periodically introducing a second stream of untreated solution into said membrane separation means at a pressure greater than the operating pressure of said first stream so that the second stream washes the treated solution from the side of said membrane separation means.

References Cited
UNITED STATES PATENTS 3,250,701  5/1966  Watson et al. _____ 210—19 X
3,355,382  11/1967  Huntington _____ 210—22

REUBEN FRIEDMAN, Primary Examiner

FRANK A. SPEAR, JR., Assistant Examiner

U.S. Cl. X.R.

210—136, 321, 409, 433